(No Model.)

G. SCHUBERT.
BALING PRESS.

No. 498,032. Patented May 23, 1893.

Witnesses:
N. D. Lewis
W. D. Howell

Inventor.
George Schubert.

UNITED STATES PATENT OFFICE.

GEORGE SCHUBERT, OF WALNUT, TEXAS.

BALING-PRESS.

SPECIFICATION forming part of Letters Patent No. 498,032, dated May 23, 1893.

Application filed January 13, 1893. Serial No. 458,262. (No model.)

*To all whom it may concern:*

Be it known that I, GEORGE SCHUBERT, a citizen of the United States, residing at Walnut, in the county of Bosque and State of Texas, have invented certain new and useful Improvements in Baling-Presses; and I do hereby declare the following to be a full, clear, and exact description of the invention, such as will enable others skilled in the art to which it appertains to make and use the same, reference being had to the accompanying drawings, forming part of this specification, in which drawings—

Figure 1:
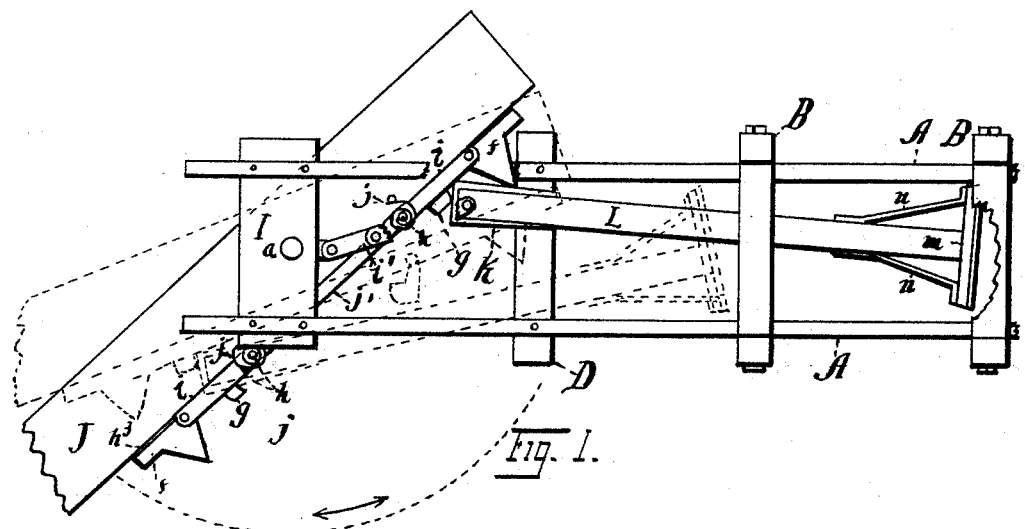
Figure 2:
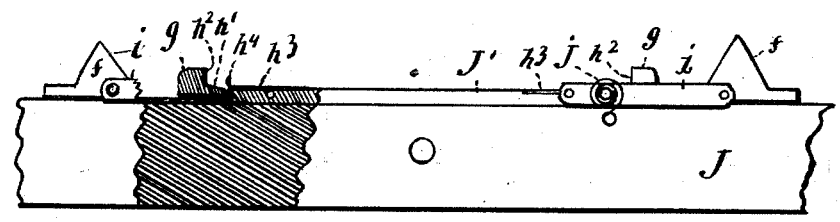
Figure 3:
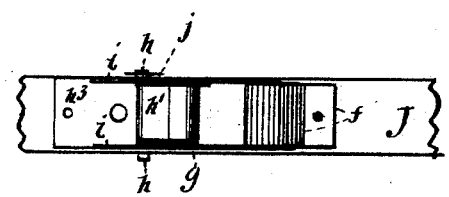

Figure 1 is a plan view of a portion of a baling press provided with my improvement. Fig. 2 is a partial section view of the main operating lever. Fig. 3. is a plan view of the operating lever showing my improvement.

This invention relates to an improvement in baling presses, having a rebounding plunger; and the object of my improvement is to construct an effective and substantial tripping and catching mechanism, simple in construction, low of production, and durable and easy to trip.

Referring to the drawings, A, A designate the frame bars of the press secured in position by the cross frames B, B. The bars A, A, are extended, to receive near their ends the bolster plates I, to receive the usual king-bolt $a$; on said king bolt $a$ is pivoted the operating lever J.

L designates the plunger-bar and $m$, is the plunger head secured on the end of the plunger bar L by the braces $n$, $n$. The opposite end of the plunger bar L is preferably ironed $k$, as shown, and connected by a chain or, flexible strip $i'$, as shown, of proper length and secured to a lug secured to the front edge of the bolster plate I.

D is a cross bar secured to the frame bars A A and forms a guide for the plunger bar L.

$f, f$, designate trip blocks rigidly secured to the front side of the lever J, a proper distance apart and equal distance from the king-bolt $a$.

$g, g$, designate trip dogs having a part of their bodies $h'$ reduced in size forming the shoulders $h^2$ and having their other or outer corners rounded as shown, and resting with their bodies against the front side of the lever J. Said dogs are located a proper distance apart and a short distance inward (toward the king bolt $a$ from the blocks $f, f$,) and resting with their smaller or inner ends against the shoulder $h^4$ formed by the iron $h^3$, and are pivoted in the strip $i$. The upper pivots of the said dogs project through said strips, $i$, a short distance and are perforated to receive one end of the spring $j$ which is coiled a few times around said pivot $h$, and secured with its other end on the body of the lever J, in a manner to close the said dogs $g, g$, against the lever J, (as shown,) with their free ends in opposite directions when in their normal positions.

The space between the shoulders $h$, (see sectional view Fig. 2,) is filled in with a proper strip J'. The strips $i, i$, are preferably secured with one end to the strip J', and with the other end to the trip blocks $f, f$.

The strips $i, i$, and the pivots of the trip dogs $g, g$, can be of sufficient strength to be operated without the shoulders $h^4$ when so desired.

The operation is as follows, viz: When the lever J arrives at the angle, shown in full lines the trip block $f$ commences to pass on the plunger bar L thus moving the dog $g$ out past the center of pressure when the rebounding of the pressed material will move the dog $g$, in the position seen in dotted lines, and allow the plunger bar L to shift to the position as seen in dotted lines. At this time the lever J is also in the position shown in dotted lines, when the feeding chamber is refilled and the lever J moved in the direction as indicated by dotted lines when the operation above described is repeated.

Having thus described my invention, what I claim, and desire to secure by Letters Patent, is—

1. In a baling press, having a rebounding plunger and plunger-bar, the combination, of the lever J having the trip blocks $f, f$, and the dogs $g, g$, pivoted to the lever J, as shown, and held in position by a spring or its equivalent substantially as and for the purposes described.

2. In a baling press, having a rebounding plunger and plunger bar, the combination, of the lever J having the trip blocks $f, f$, and the dogs $g, g$ pivoted to the lever J, as shown and held in position by a spring or its equivalent, shoulders $h^4$ as and for the purposes described.

In testimony whereof I have affixed my signature in presence of two witnesses.

GEORGE SCHUBERT.

Witnesses:
J. P. GRACE,
R. W. AYCOCK.